April 30, 1968     S. A. BULIN     3,380,313

REEL DRIVE MECHANISM

Filed May 4, 1966     2 Sheets-Sheet 1

INVENTOR.
SHELLY A. BULIN
BY Geo. J. Meckenthaler ATTY
       AGT

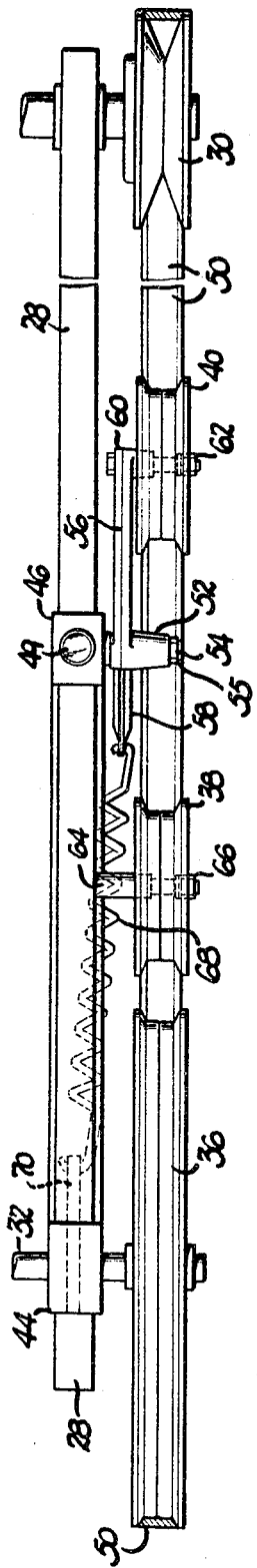

United States Patent Office 3,380,313
Patented Apr. 30, 1968

3,380,313
REEL DRIVE MECHANISM
Shelly A. Bulin, Davenport, Iowa, assignor to J. I. Case Company, Racine, Wis., a corporation of Wisconsin
Filed Mar. 4, 1966, Ser. No. 531,682
3 Claims. (Cl. 74—227)

ABSTRACT OF THE DISCLOSURE

An adjustable drive mechanism having a drive element trained over a pair of idler pulleys, one pulley being fixed and the other movable, to compensate for movement of a driven sheave in a fore and aft direction in relation to a driving sheave. The movable idler is connected to a support for the driven sheave and is slidable with the driven sheave along a beam which carries the driving and driven sheaves and the idlers.

---

The present invention relates generally to harvesters, and more particularly to a harvester reel drive adjustment means for a harvester thresher.

As is well known, harvesters of the combine type are used to gather and thresh various crops, these crops varying in height and density of growth. The header and the cutter bar of a combine are constructed normally to be raised and lowered depending upon the height of the crop material, and also the height at which the operator wishes to cut above the ground level. Mechanisms for raising and lowering the cutter bar are a part of the modern harvester machines. Another part of the header, commonly called a reel, moves up and down with the cutter bar, however, there are times when the reel must also be moved in a fore-and-aft direction to properly and efficiently move the crop material, which has been cut, onto a conveying platform or an auger, which auger carries the material to a conveyor or feed rake and which rake conveys the material to the threshing mechanism. Once the reel has been adjusted in a correct fore-and-aft position for a certain crop, it will probably not be moved except in extreme cases. However, when cutting a different type of crop material it is sometimes necessary to readjust the reel for efficient operation. In prior machines, when the reel was moved in a fore-and-aft direction, the reel drive means had to be readjusted or changed to compensate for the increased or decreased distance between the driving member and the driven member.

The main object of the present invention is to provide an improved reel drive mechanism.

An additional object is to provide a mechanism which eliminates the need for shortening or readjusting the reel drive means.

A further object is to provide a mechanism which eliminates the need for relocating the reel drive means take-up device in relation to the reel.

A still further object is to provide a mechanism which maintains the proper tension in the reel drive means at all times.

Additional objects and advantages will become apparent from a reading of the specification and the annexed drawings, in which:

FIG. 4 is an enlarged plan view of certain mechanism shown in FIG. 1; and

FIG. 5 is a side view of the mechanism shown in FIG. 4.

Figure 1:
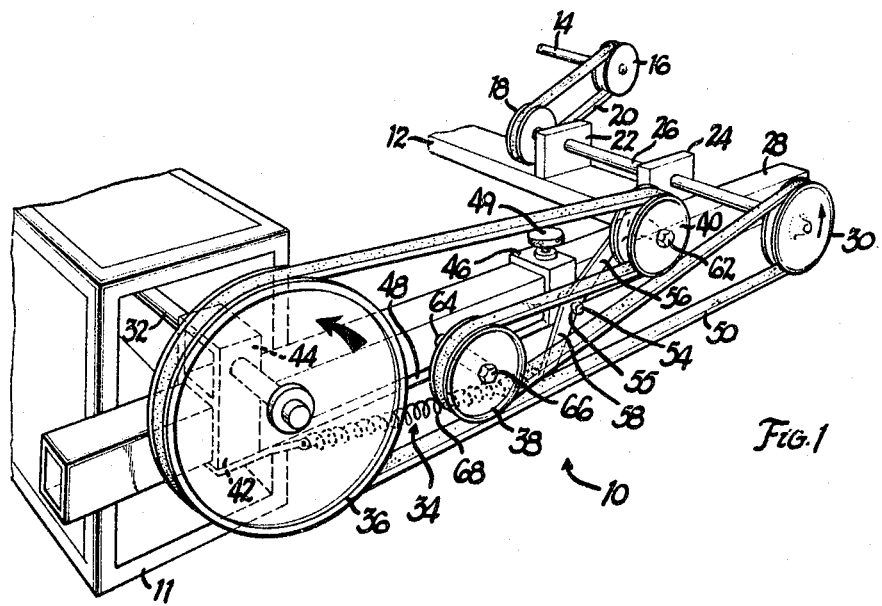
FIGURE 1 is a perspective view of the invention.

As seen in FIG. 1, the invention comprises a reel drive mechanism, generally designated as 10, for a combine-type thresher. The combine has a frame, driving and steering wheels which movably support the frame, a header and a threshing mechanism, these being common and conventional features which are not necessary to further describe. FIG. 1 shows a header member 12 positioned and supported transverse to the direction of travel of the combine and which supports the reel drive mechanism. The header normally includes a cutter bar or sickle on the forward part thereof, an auger trough, and an auger for conveying the crop material. A reel 11, for gathering and moving the top of the material rearward where it is carried by the auger to the threshing mechanism, is also shown as a part of the header mechanism. These parts of the header are of any conventional or suitable construction and will not be further described except as they relate to the present invention.

A conventional prime mover is located on the combine which supplies the power for the traction wheels and for the harvesting and threshing mechanisms. A shaft 14 connected in any suitable manner to the prime mover, and which shaft also may drive other auxiliary devices on the machine, is shown as carrying a pulley 16. Header member 12 carries supports 22 and 24 through which a shaft 26 protrudes and on one end thereof is fixed a pulley 18 and carrying a drive belt 20. It is thus seen that shaft 26 is journaled in supports 22 and 24 for transmitting mechanical energy from shaft 14 to be used in driving the various devices. Fixed on shaft 26, is a driver or drive means 30 which is shown as a sheave-type pulley. Disposed adjacent member 12 and extending in a forwardly direction is a first support means or beam member 28 and which shaft 26 also extends through out end thereof for supporting pulley 30. At the forward end of member 28, is a reel shaft 32 supported thereon, the shaft 32 being journaled through a second support means or member, generally designated as 34. Shaft 32 carries a driven means or sheave 36, this sheave being aligned with sheave 30 and which will be more fully described.

Interposed between driver 30 and sheave 36 are a fixed idler means 38 and a movable idler means 40. These idlers are also aligned with driver 30 and sheave 36. The second support means 34 includes forward portions 42 and 44, portion 42 being slidable on member 28. Portion 44 contains the journaled bearing for shaft 32, so as the reel 11 is moved fore-and-aft, portions 42 and 44 move along member 28. Support means 34 also includes a portion 46 which is nearer the center of member 28. A connecting portion 48 is disposed along one side of member 28 and therefore the second support means 34 includes portions 42, 44, 46 and 48 as one member, the entire member being slidable along the first support means 28. A locking means 49 is provided in portion 46 for securing the second support 34 to the first support 28.

A reel drive means 50 is shown as a flexible belt and which drivingly connects pulleys 30, 36, 38 and 40. Portion 46 of support 34 has an idler arm which carries a hub 52 and extending arms 56 and 58, and includes a pin 54 secured by a nut 55. Pin 54 is fixed to portion 46 and this serves as a bearing pin for hub 52. The movable idler pulley 40 is journaled on the outer end of arm 56 on a pin 62 and secured by a nut 63 against a hub 60. The fixed idler pulley 38 is journaled on member 28 by means of a pin 65 secured by a nut 66 against a hub 64.

Arm 58 has an opening 67 at one end thereof and a resilient means 68 is connected to the arm. An arm 70 is secured to portion 42 of support 34, the arm having an opening 71 for connecting the other end of spring 68. The spring under tension therefore urges the movable idler means from the driven means 36 to maintain proper tautness in the belt.

Figure 2:
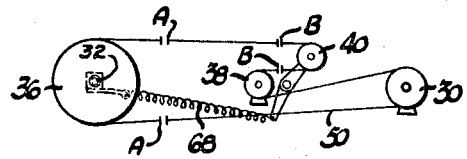
FIG. 2 is a diagrammatic view of the parts in one position of the reel.
Figure 3:
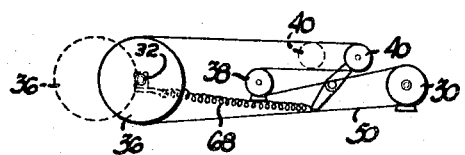
FIG. 3 is a similar view of the parts in another position of the reel.

As seen in FIGS. 2 and 3, the reel drive mechanism includes as its basic parts, pulleys 30, 36, 38 and 40. In FIG. 2 is shown a diagram of these pulleys, the reel drive means or belt 50, and the relative positions of the pulleys. Whenever the reel 11, the reel shaft 32 and pulley 36 are moved in a fore-and-aft direction, the movable idler or take-up pulley 40 moves the same amount. Letters A and B denote an adjustment or difference in the length of belt 50, and it can be seen that since pulleys 36 and 40 are on a common support, any movement of pulley 36 will necessarily move pulley 40. FIG. 3 shows the position of these pulleys when the reel has been moved in a rearward direction.

FIGS. 4 and 5 show enlarged views of construction details and it can be seen that herein described is a novel means of moving the reel in a fore-and-aft direction, as may be required by the operator, and which eliminates, at the same time, the need for shortening or readjusting the reel drive means. The reel drive means or belt 50 is, of course, a predetermined length and although it is flexible and will stretch a limited amount, for instance, in hot weather, the belt normally cannot be shortened or lengthened to compensate for a change in distance between the reel driver and the driven reel sheave. Thus, the mechanism, as described above, eliminates the need for relocating the belt take-up idler each time the reel is relocated with respect to its driver. The belt take-up idler is fixed with respect to the driven reel sheave by reason of being on the common support so that when the reel is moved rearward the movable idler moves rearward the same distance and the belt distance is lengthened as between the center lines of the movable idler pulley and the fixed idler pulley.

In the case of a chain drive, the pulleys, of course, would be replaced with sprockets, and if it was desired to shorten the reel drive means, a link could be removed. However, this takes additional time and the operator can ill-afford precious time when in the midst of the harvest season. The belt tension spring could be replaced with a threaded member and adjustment made to keep the proper tension on the belt or chain. The locknut which holds the entire unit, the second support means, in a desired position may be replaced with a hydraulic ram or a screw type mechanism whereby the entire reel positioning may be done by remote control.

It is believed that the above description fully discloses and explains the invention and that embodiments other than those described may occur to those skilled in the art. It is to be understood that all of these variations are considered to be within the scope of this invention. The invention as described is not intended to be taken as limited by the embodiment disclosed nor in fact in any manner except as defined in the annexed claims.

What is claimed as new and desired to be secured by Letters Patent of the United States is:

1. A reel drive mechanism for a harvester of the type having a frame, a header carried on the frame, and means for driving said mechanism; said mechanism including first beam support means on the header and extending forwardly thereof, drive means on said first support means and connected to said means for driving, second beam support means slidable fore and aft on said first support means, a reel shaft journaled on said second support means, said shaft extending transverse to said harvester, driven means positioned on said reel shaft to align with said drive means, endless drive means drivingly connected to said drive and driven means, an idler arm positioned on said second support means intermediate said drive and driven means, movable idler means on said idler arm and carrying said endless drive means, said movable idler means and said driven means being commonly movable along said first support means, spring means connected to said idler arm and to said second support means for urging said movable idler means from said driven means and toward said drive means, means on said second support means for securing and locking said second support means to said first support means, and fixed idler means carrying said endless drive means and securely positioned on said first support means intermediate said movable idler and said driven means whereby movement of said reel shaft and said driven means in said fore-and-aft direction displaces said movable idler means the same amount and maintains tension in said endless drive means.

2. A mechanism according to claim 1 wherein the second support means is a slidable member on said first support means at the forward end thereof and unitarily carries the driven member and the idler arm in said fore-and-aft direction.

3. A mechanism according to claim 1 wherein the means for urging the movable idler means from the driven means is a tension spring positioned under and slidable with said second support means along the first support means.

References Cited

UNITED STATES PATENTS

| | | | |
|---|---|---|---|
| 1,801,043 | 4/1931 | Harber et al. | 74—219 |
| 1,892,067 | 12/1932 | McMillan | 74—242.1 X |
| 2,683,993 | 7/1954 | Covert | 74—219 |
| 3,238,802 | 3/1966 | Budzyn | 74—219 |
| 3,262,330 | 7/1966 | Cheatum | 74—242.15 X |

FOREIGN PATENTS 257,371    9/1926    Great Britain.

FRED C. MATTERN, JR., *Primary Examiner.*

J. A. WONG, *Assistant Examiner.*